Patented Nov. 27, 1945

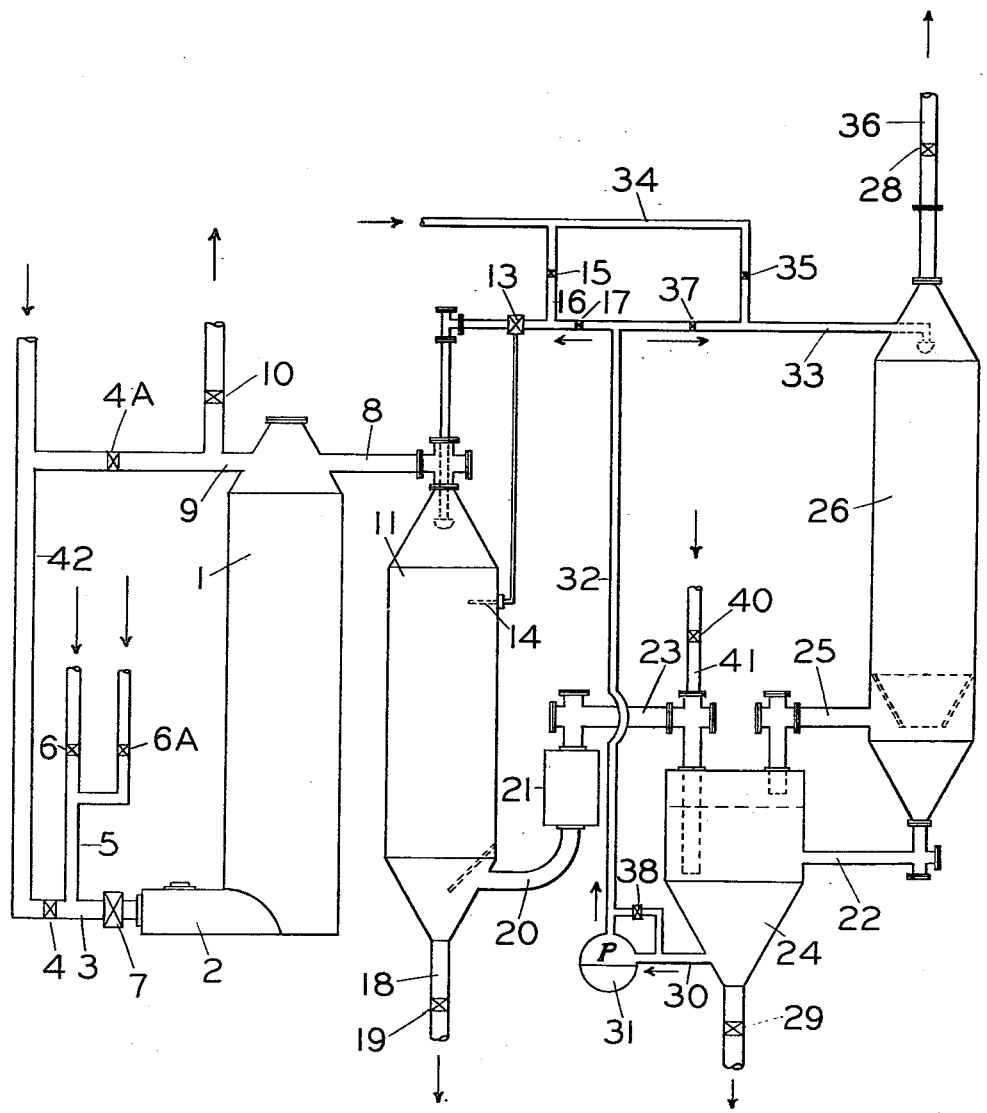

2,389,810

UNITED STATES PATENT OFFICE 2,389,810

PROCESS FOR RECOVERING ELEMENTAL SULPHUR FROM SULPHUROUS GASES

William W. Odell and William Dean Harbert, El Dorado, Ark., assignors to Lion Oil Refining Company, El Dorado, Ark.

Application June 1, 1943, Serial No. 489,268

6 Claims. (Cl. 23—225)

This invention relates to a process for recovering elemental sulphur from sulphurous gases, of which the following is a specification. The process deals largely with the oxidation of the sulphur compounds in sulphurous gases, or gases containing combustible sulphur compounds, and the subsequent reduction of the oxidized product or products, thereby forming elemental sulphur which is recovered. More particularly the process relates to the conversion or oxidation of hydrogen sulphide whereby elemental sulphur is produced and recovered.

One of the objects of our invention is the recovery of elemental sulphur from gaseous fluids containing combustible sulphur compounds particularly hydrogen sulphide. Another object is the recovery of a very high percent of the total sulphur initially present in the gaseous fluid, as elemental sulphur in colloidal or molten condition or controlled proportions of each. Another object is the recovery of elemental sulphur from waste gases containing hydrogen sulphide and sulphur dioxide or containing hydrogen sulphide which can be oxidized. Other objects will become manifest from the disclosures and claims.

It is recognized that it is not new to burn hydrogen sulphide gas or other gas containing combustible sulphur compounds, with a controlled limited supply of air or oxygen-bearing gas and produce thereby a certain amount of elemental sulphur which can be condensed and recovered from the products of reaction. These combustion reactions can be conducted either with or without a catalyst; a catalyst is useful for this purpose chiefly when the percentage amount of combustible sulphur compounds present in the gas being treated is rather low. When the amount of combustible sulphurous gas or vapors present in a fluid stream is sufficiently great to liberate considerable heat upon its incomplete oxidation catalysts are not so essential as when relatively small amounts of heat are evolved in the oxidation step.

One form of apparatus in which our invention may be practiced is shown diagrammatically in elevation, and rather schematically as a flow diagram, in the figure.

In the figure the prime combustion chamber 1 has an ignition furnace 2, with conduit 3 for supplying sulphurous gas through valve 4, mixing box 7, and connections whereby air and diluent gas or vapor are introduced into 3 respectively through valves 6 and 6—A; a discharge offtake 9 for gaseous combustion products formed during the starting up period has control valve 10, whereas the offtake 8 for oxidized sulphurous gas and vapors connects directly with collecting chamber 11 which chamber is filled with sized contact material which may be catalyts. Liquid sulphur collected in collector 11 discharges through offtake 18 and valve 19, whereas the stream of gases and vapors leave 11 through offtake 20 passing into mist extractor 21 from whence they pass through conduit 23 to washbox 24 which is substantially filled with a quenching fluid. The offtake 25 from wash-box 24 conducts the stream of gases and vapors into scrubber 26 from which effluent gases and vapors pass out through valve 28 and conduit 36. Quenching fluid flows under its own head from wash-box 24, through 30 to pump 31 which latter discharges said fluid into conduit 32, the fluid passing under pump pressure from 32 in either or both of two directions, namely, through valve 17 and thermally controlled valve 13 to chamber 11, and through valve 37 and conduit 33 to scrubber 26. Valve 38 is a check-bypass valve set at a predetermined pressure. Valve 13 is actuated by thermal control unit 14 in accordance with the temperature prevailing within chamber 11, being opened beyond a set condition when the temperature at substantally the location of said thermal unit rises above about 275° F. (135° C.) and tending to close as the temperature falls below about 275° F. Means for introducing hydrogen sulphide or a fluid containing hydrogen sulphide into the stream flowing from 23 to chamber 24 are shown by valve 40 and connecting conduit 41. Means for introducing a supply of hydrogen sulphide into the upper portion of chamber 1 comprises conduit 42 and valve 4—A.

In producing sulphur according to the herein described process three important chemical reactions are involved and will be discussed, namely, (1) $H_2S + \tfrac{1}{2}O_2 = H_2O + S$
(2) $H_2S + 1\tfrac{1}{2}O_2 = H_2O + SO_2$
(3) $2H_2S + SO_2 \rightleftarrows 2H_2O + 3S$ It is well known that the above reactions occur but in attempting to make Reaction 1 go substantially to completion with the formation of elemental sulphur, difficulties arise. If a gas contains a very high percent of $H_2S$, for example, the temperature attained in the combustion chamber is excessive and refractories will not long stand exposure thereto; if excess air is employed Reaction 2 occurs. Our experiments show that at high temperatures Reaction 3 occurs right to left but that at high velocities through the combustion chamber, as through 1 of the figure. Reaction 1 takes place first, left to right, if excess air is not employed. Thus more than 85 percent of the sulphur in the sulphurous gas can be converted to elemental sulphur if high velocity of flow of reacting fluid is maintained in the combustion chamber 1 and if excess air or oxygen is avoided; at lower rates of flow of the reacting gaseous stream through chamber 1, lower temperatures, below 1800° F., should prevail therein. Our experiments show further that in order to operate within the normally preferred limit of temperature, namely below about 1800° F., the $H_2S$ content of the sulphurous gas being reacted should not be greater than about 30 percent and preferably not over 25 percent. These upper limits for the $H_2S$ content apply when $H_2S$ is the major sulphurous component present in the gas being treated. The important point is that the combustible sulphur compounds burned in the combustion chamber preferably should not be present in the reaction mixture in an amount great enough to produce a temperature in said chamber above about 1600° F. to 2000° F. unless very high rates of flow of the reacting fluid stream are maintained in 1.

EXAMPLE 1

It is a common occurrence in promoting the partial oxidation of sulphur to find that after the sulphur has been formed and removed, the effluent gas contains some $H_2S$ and some $SO_2$. In our studies of ways and means for recovering the sulphur from the latter gases, our process has developed; it permits the recovery of a large or small percent of the total recovered sulphur as either liquid sulphur eventually cooled and solidified, or finely divided and colloidal sulphur as a slurry or powder. When the total sulphur equivalent of the sulphurous gas to be treated is very high it is preferably diluted with stack gas, carbon dioxide or other inert gas relatively low in moisture content. The need for this is not disclosed in the art, so far as we are aware.

Referring to the figure and employing as the sulphurous gas a mixture of 21.8 percent of $H_2S$ and 78.2 percent of $CO_2$, the operation, with one method of procedure, and using air-gas mixtures proportioned substantially for promoting the reaction of Equation 1, is as follows:

The sulphurous gas is introduced into combustion chamber 1 as a stream by opening valve 4; simultaneously valve 6 is opened to admit the proportioned amount of air, the mixture passing through mixing box 7, into furnace section 2 wherein combustion is initiated. Until the contact material in 1, which may be checker brick refractory, a porous bed of catalytic material or other contact material, is heated to substantially the ignition temperature of the $H_2S$, or higher, the products of combustion are expelled under their own pressure through 9 and valve 10. When the latter temperature has been reached valve 10 is closed and the stream initially containing the products of combustion is caused to pass consecutively through 8, chamber 11, offtake 20, mist extractor 21, offtake 23, wash-box 24, offtake 25, scrubber 26 and exit 36 through valve 28. The temperature of the gaseous stream passing through 8 into 11, after equilibrium has been reached, is normally approximately 1250° F. to 1350° F. varying according to rates of flow, size of equipment and other variables. Quenching fluid is pumped from wash-box 24 by pump 31 and discharged under control as a spray into the upper portion of 11, passing consecutively through conduit 32, valve 17 which is now open, and thermally controlled valve 13 which valve is actuated in accordance with the temperature indicated by thermal unit 14. The amount of quenching fluid thus passing through valve 13 is sufficient only to cool the gas stream to about 275° F. The cooled gaseous stream, passing through 11, deposits condensed sulphur on the contact material in 11 which material is preferably uniformly sized, small solids having appreciable surface such as refractory silicious material; metal oxides or both. Metal, preferably as spheres, can be used but it should be one that is resistant to the action of sulphurous vapors at elevated temperatures. The condensed sulphur drains down and is discharged through 18 and valve 19, preferably at a rate substantially as formed. The gaseous stream passing out of 11 through 20 contains some condensed sulphur as a fine mist, and this is separated from the stream in mist extractor 21 while said stream is still at a temperature above about 250° F. The stream passing out of 21 through 23 to wash-box 24 contains a large percentage of $CO_2$ and $N_2$ along with some $H_2S$ and $SO_2$ as well as a small amount of sulphur in the vapor phase. The gas stream is quenched further as it passes into and through wash-box 24 wherein it passes through a liquid seal of quench liquid. The $H_2S$ and $SO_2$ react according to Equation 3 and finely divided sulphur is precipitated. The gaseous stream passing out of 24 through 25 into scrubber 26 still contains some $H_2S$ and $SO_2$ and in order to recover additional sulphur it is necessary to cause further reaction according to Equation 3 in the stream passing upwardly through scrubber 26. This is accomplished by causing some of the quenching fluid pumped by pump 31 to pass through valve 37 and conduit 33 as a stream into the upper portion of 26 wherein it is sprayed over suitable contact material, 26 being preferably a packed-column type scrubber. If additional water is not introduced into the system the volume of liquid quench in wash-box 24 will decrease and the slurry of sulphur will become thicker and thicker as operation progresses and the temperature of the quenching fluid or slurry will approach 212° F. when the pressure in 26 is substantially atmospheric. Accordingly an additional amount of coolant is added as a "make-up" quenching fluid; this is preferably water but may be other liquid. This liquid is admitted through valve 35 preferably in amounts such that a reasonably thin pumpable slurry is maintained in wash-box 24 while withdrawing slurry through valve 29 at a rate substantially comparable with the rate of precipitation of sulphur. To be more specific, if 3000 pounds of sulphur are precipitated per hour in chambers 24 and 26 and it is desired to draw off 1000 pounds of sulphur per hour in a slurry, valve 29 is opened sufficiently to discharge the 1000 pounds of sulphur and the concentration of the sulphur in the slurry is controlled by the amount of "make-up" water introduced through valve 35, the remaining 2000 pounds are converted to liquid sulphur in 11 by virtue of circulation of the slurry thereto. In the event that all of the 3000 pounds of sulphur precipitated largely according to Reaction 3 are wanted as a slurry, valve 17 is closed and fresh quenching fluid, water, is admitted to 11 by opening valve 15, the liquid passing through conduit 16, and thermal valve 13 as before. In this manner none of the slurry is circulated from the pump to the collecting chamber 11, it is merely circulated from 24 through pump 31, conduit 32, valve 37 and conduit 33 to the scrubber 26. A very thick slurry can be collected in 24 when the supply of make-up is curtailed, whereas a very thin slurry results if an excess of liquid quench "make-up" is admitted through 35. In all cases the precipitated sulphur is withdrawn at a rate or at such intervals that a bothersome accumulation of it in 24 is avoided. It will be noted that the sulphur slurry introduced as a quenching fluid into 11 through valve 13 is heated above the normal boiling point of water and above the melting point of sulphur, hence, to the extent that this quenching medium is used in 11 the colloidal sulphur can be converted into liquid sulphur and collected or deposited in 11. Thus it is possible to vary the percentage amount of colloidal or slurry sulphur recovered from zero to an appreciable amount.

In the above example, the volume and temperature relationships are substantially as follows:

*Initial gas-air mixture*

$H_2S$ ------------ 218 cu. ft. } Gas 1,000 cu. ft.
$CO_2$ ------------ 782 cu. ft.
$O_2$ ------------ 109 cu. ft. } Air 521 cu. ft.
$N_2$ ------------ 412 cu. ft.

Total _____ 1,521

*Products of combustion*

| | |
|---|---:|
| $H_2S$ | 13.3 |
| $SO_2$ | 6.7 |
| $CO_2$ | 782.0 |
| S | 99.0 |
| $H_2O$ | 204.3 |
| $N_2$ | 412.0 |
| Total | 1,517.3 |

Thus 1000 cubic feet of the original sulphurous gas with 521 cubic feet of air yield approximately 1517 cubic feet of products, no correction being made for the effect of temperature on volume. The products of combustion are cooled by the quenching fluid passing into 11 through 13, from approximately 1300° F. to 275° F. The amount of quenching fluid required per 1000 cubic feet of the original sulphurous gas stream oxidized is approximately 5 gallons if warm water is used, and somewhat less when slurry containing suspended solid sulphur is used as quenching medium in chamber 11. The cooled products of combustion now contain the additional moisture resulting from the evaporation of the quenching water, and the sulphur is condensed out of the stream; the stream entering the wash-box 24 has a composition substantially as follows:

| | Cubic feet | Per cent |
|---|---:|---:|
| $H_2S$ | 13.3 | 0.59 |
| $SO_2$ | 6.7 | 0.30 |
| $CO_2$ | 782.0 | 34.57 |
| S | 0.1 | .01 |
| $H_2O$ | 1,048.0 | 46.33 |
| $N_2$ | 412.0 | 18.20 |
| | 2,262.1 | 100.00 |

When this stream of the above amount of gases and vapors is cooled to 178° F. by contact with quenching fluid in wash-box 24 and scrubber 26 the heat energy absorbed is approximately 7,650 B. t. u. and the gaseous stream is substantially saturated with water vapor at the said 178° F. The amount of water quench required to absorb this 7,650 B. t. u. is approximately 65 pounds or 7.8 gallons, the water being initially at 60° F. If no water is added at all as "make-up" through valve 35 the quenching fluid for scrubber 26 being supplied entirely by slurry pumped through valve 37, there would be a rise in the temperature of the quenching liquid in wash-box 24 approaching 212° F. and an evaporation of water in 24. Now, when the 7.8 gallons of "make-up" water are introduced through 35 and 33 into the scrubber for every 1000 cubic feet of the original sulphurous gas treated the temperature will remain at 178° F. in the wash-box even though the 5 gallons of slurry are withdrawn and pumped through the thermal valve 13 to chamber 11. The difference, 7.8−5 or 2.8 gallons, is the approximate accumulation of water in the system with the precipitation of 1.7 pounds of sulphur in said water or about 7.4 percent of sulphur in the slurry. If a greater concentration of sulphur in the slurry is desired it is only necessary to diminish the supply of "make-up" quenching fluid by throttling valve 35, in which case the temperature increases somewhat in the wash-box and scrubber. A similar result can be obtained by employing less quenching fluid to chamber 11 but it is important that a temperature in the vicinity of 320° F. in that chamber should be avoided because of the viscous property of sulphur at that temperature.

When there is no demand for the colloid or slurry sulphur it is a simple matter to so adjust the supply of so called "make-up" fluid introduced through valve 35, usually water, that no slurry is withdrawn from the recirculating slurry system other than that circulated by the pump through valve 13 to chamber 11. In this manner the sulphur is withdrawn from the system entirely in the liquid form from chamber 11. The recirculating rate of flow of the slurry stream through 26 can be as desired whereas the quantity circulated through 13 to 11 is more or less fixed according to the reduction in temperature desired in the stream flowing through chamber 11. However when slurry sulphur is not withdrawn through valve 29 or elsewhere from the system it is sometimes desirable to close valve 37 and employ as a quenching or scrubbing fluid water admitted through valve 35.

A finely divided sulphur of a different character but still a suspended or slurry sulphur can be obtained by a very slight change in the details of procedure; this is done when the demand for sulphur in a fine state of subdivision is great as follows:

EXAMPLE 2

Referring to the figure and employing the same gas as in Example 1, start the operations exactly as described in the latter example. After operations are under way adjust the thermal valve 13 so that less quenching fluid passes into 11 than in Example 1 and the temperature in 11 rises to, say, 625° F. At this temperature sulphur has a vapor pressure of 95 mm. of mercury, and accordingly there will be present in the gas stream leaving 11 at 625° F. 12.5 percent by volume of sulphur vapor. Under the conditions of this example it is preferable to use water as the quenching fluid in chamber 11 and it is introduced therein through valve 15, conduit 16 and valve 13. The gaseous stream now passing into the wash-box 24 from 23 is hotter than in Example 1 and it contains only about 50 to 55 percent as much water vapor as in Example 1. All of the slurry collecting in the wash-box is preferably pumped back into the top of scrubber 26 except that which is drawn off through valve 29; the concentration of the sulphur in the slurry is controlled by simply regulating valve 35 supplying "make-up" quenching liquid, usually water. As in Example 1 slurry is withdrawn through valve 29 substantially as it accumulates in wash-box 24.

EXAMPLE 3

Another modification of operating procedure, but employing what we believe to be important features of this invention, is as follows: Referring to the figure, start operations similarly as is Example 1 only introduce sufficient air through 6, 5 and 7 with the sulphurous gas passing through 4, 3 and 7 into chamber 1 so that reaction occurs therein according to Equation 2. Then for each volume of sulphurous gas thus reacted introduce similarly as a stream two volumes of the sulphurous gas through valve 4—A. The two streams join and pass immediately from 1 through offtake 8 to separator 11. This causes substantially all of the sulphur formed to be substantially a result of the reaction shown in Equation 3. Since this reaction is a relatively low-temperature reaction it is possible, by controlling temperature as described, to cause a very large amount of the total recoverable sulphur to collect in the slurry. It is only necessary to withdraw the sulphur from wash-box 24 substantially as fast as it accumulates. The volume of make-up water introduced into 24 through valve 35 is controlled to give the right concentration of sulphur in the slurry. A very viscous or a thin slurry can thus be produced at will.

In conducting operations according to this invention numerous other modifications can be practiced; it is only necessary to maintain temperatures in the equipment ahead of the wash-box at temperatures where sulphur is in the liquid or vapor phase and below 120° C. in the wash-box 24 and scrubber 26. Two additional examples are presented however which might not be obvious from the foregoing disclosure.

EXAMPLE 4

This method of practicing our invention, adaptable particularly to the production of slurry sulphur, is as follows: Start the operation as indicated in Example 1 and after operation is well under way alter the gas-air ratio so that primarily reaction (2) occurs in reaction chamber 1. The stream passing out of 1 through 8 contains the sulphur largely as $SO_2$. This stream is partly cooled by introducing water into chamber 11 through valve 13 as described preferably avoiding cooling to the dew point of water finally present in the gas leaving chamber 11. A supply of the original gas containing $H_2S$ is admitted to the stream through valve 40 and the united stream is passed into and through wash-box 24 and scrubber 26 as described. The amount of said $H_2S$ gas thus admitted is preferably in the proportion adapted to react with the cooled $SO_2$ according to Equation 3. The sulphur slurry in this case is preferably recirculated through the scrubber and wash-box only and the rest of the operation is as described.

EXAMPLE 5

An additional method of practicing our invention, in which chamber 11 contains a catalyst bed, is as follows: Start the operation as given in Example 1 and when operation is well under way adjust the amount of quenching fluid passing through valve 13 such that the stream of sulphur containing vapors passes through the catalyst bed of chamber 11 at a temperature sufficiently high to prevent the condensation therein of liquid sulphur. In the catalyst bed the $H_2S$ and $SO_2$ react as shown in Equation 3 and a substantial amount of sulphur vapor is formed by virtue of the catalyst. The fluid stream from the catalyst bed passed through mist extractor 21 and to the wash-box 24 where the stream is cooled by the sulphur slurry and the sulphur condensed out. The residual stream passes through the scrubber where much of the remaining sulphur is removed. Makeup water is added to the scrubber through valve 35 and the product sulphur is withdrawn from the wash-box 24 through valve 29 as a sulphur slurry. Similarly a catalyst bed can be used for the promotion of Reaction 3 in the method outlined in Example 3 whereby a large proportion of the $H_2S$ and $SO_2$ in the gaseous stream are reacted to form sulphur in chamber 11.

It is worthy of note that the slurry functions catalytically in the conduction of Reaction 3 and also as a quenching medium. The sulphur in the slurry as collected, that is, separated from the system, has properties which in many ways differ from ordinary powdered or ground sulphur; it is particularly well suited for use for agricultural purposes.

Other sulphur gases and vapors lend themselves to conversion to sulphur employing this invention. Some equations indicating the reactions are as follows:

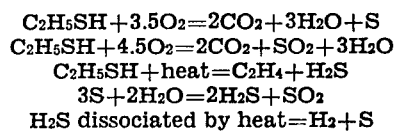

Normally we prefer to operate with pressures in the apparatus somewhat above atmospheric pressure although higher or lower pressures may be used.

Summarily it may be stated that a sulphurous gas, preferably one containing appreciable amounts of $H_2S$ is so oxidized by combustion reactions in a reaction chamber, as in 1 of the figure, at a high elevated temperature of the order of 1300° to 2000° F. The gaseous stream of reaction products contain sulphur in the vapor phase, hydrogen sulphide and sulphur dioxide. The stream of hot reaction products leaving 1 through 8 of the figure are quickly quenched in condenser 11 by spraying into 11 a stream of sulphur-in-water slurry in sufficient amounts to reduce the temperature of the stream to about 275° F. The sulphur is largely condensed and is caused to be removed from the stream by contact with especially provided contact material in chamber 11 from which it is removed as a liquid. The $SO_2$ and $H_2S$ remaining in the gas stream are caused to react with one another by virtue of lower prevailing temperature and contact with the sulphur slurry in wash box 24 and scrubber 26. It is, of course, well known that the reaction between $SO_2$ and $H_2S$, numbered Equation 3 above, occurs at low temperatures with the formation of sulphur and water although the reaction is not rapid, whereas at high temperatures the reverse is true, namely sulphur combines with water vapor to form $H_2S$ and $SO_2$. It is advantageous in forming sulphur by the low temperature reaction of these gases to cause them to make intimate contact with a sulphur slurry which is colloidal and finely divided sulphur in water. A favorable temperature was shown to be less than 212° F.

It is also an important part of this invention that means and method are provided whereby greater or less proportions of the recovered sulphur from a gas initially containing H2S can be recovered in the form of either liquid sulphur or finely divided solid sulphur as a slurry or powder.

Having described our invention so that one skilled in the art can practice it, we claim:

1. A process for producing elemental sulphur which comprises heating solid contact material within a reaction zone to a temperature of 1600°–2000° F., passing a gaseous stream containing H2S and an oxygen bearing gas through said reaction zone and over said contact material, so regulating the relative proportions of H2S and oxygen bearing gas and their rate of flow over the contact material that the temperature of the gaseous stream flowing from the reaction zone containing the contact material is approximately 1250°–1350° F. after equilibrium has been reached, whereby incomplete combustion of the H2S is produced and a gaseous stream containing sulphur vapor, SO2 and H2S is formed, cooling the gas stream to a temperature which condenses and maintains the sulphur in liquid form by passing the same over solid contact material in a cooling zone and supplying sufficient cooling fluid to effect the cooling, withdrawing the condensed sulphur from the stream of gases, passing the remaining gases from the initial cooling zone into a separate cooling zone, then condensing and solidifying the sulphur vapor in the mixture by supplying sufficient quenching fluid thereto to reduce the temperature to below 248° F.

2. A process for producing elemental sulphur which comprises heating solid contact material in a reaction zone to a temperature of approximately 1600 to 1800° F., partially oxidizing H2S by passing a gaseous stream containing H2S and an oxidizing gas over said hot solid material, withdrawing the resulting gaseous stream containing sulphur vapors from the reaction zone at a temperature of from 1200 to 1350° F and cooling said stream to a temperature which condenses and maintains the sulphur in liquid form by supplying thereto sufficient water to effect cooling by vaporization of the water, recovering the liquid sulphur, passing the remaining gaseous mixture from the initial cooling zone into another cooling zone, and supplying thereto additional water in quantity sufficient to reduce the temperature within the second cooling zone to below the melting point of sulphur and removing a portion at least of the resulting slurry.

3. A process for producing elemental sulphur which comprises heating solid contact material in a reaction zone to a temperature of approximately 1600 to 1800° F., partially oxidizing H2S by passing a gaseous stream containing H2S and an oxidizing gas over said hot solid material, withdrawing the resulting gaseous stream containing sulphur vapors from the reaction zone at a temperature of 1200 to 1350° F. and cooling said stream to a temperature which condenses and maintains the sulphur in liquid form by supplying thereto sufficient water to effect cooling by vaporization of the water, recovering the liquid sulphur, passing the remaining gaseous mixture from the initial cooling zone into another cooling zone, supplying thereto additional water in quantity sufficient to reduce the temperature within the second cooling zone to below the melting point of sulphur and removing a portion at least of the resulting slurry, and recirculating a portion of the washing liquid including sulphur in water from the second cooling zone to the first cooling zone.

4. A process for producing elemental sulphur which comprises heating solid contact material within a reaction zone to a temperature of approximately 1600 to 2000° F., passing a gaseous stream containing H2S and an oxygen bearing gas in contact with said solid material whereby incomplete combustion of the H2S is produced and a gaseous stream containing sulphur vapor, SO2 and H2S is formed, withdrawing the gaseous stream from the reaction zone at a temperature of approximately 1200 to 1350° F. cooling the gas stream to a temperature which condenses and maintains the sulphur in liquid form by passing the same in contact with solid material in a cooling zone and supplying sufficient cooling fluid to effect the cooling, withdrawing the condensed sulphur from the stream of gases, passing the remaining gases from the initial cooling zone into a second cooling zone, then condensing and solidifying the sulphur vapor in the mixture by supplying sufficient quenching fluid thereto to reduce the temperature to below the melting point of sulphur.

5. A process as set forth in claim 4 wherein the first cooling zone contains catalytic material.

6. A process for producing elemental sulphur in both liquid form and as finely divided sulphur in a slurry of sulphur and water in predetermined relative proportions, which comprises heating solid contact material within a reaction zone to a temperature of approximately 1600 to 2000° F., passing a gaseous stream containing H2S and an oxidizing gas over said contact material, so regulating the relative proportions of the H2S and oxidizing gas that the temperature of the gaseous stream flowing from the reaction zone is approximately 1250 to 1350° F. after equilibrium has been reached, whereby incomplete combustion of the H2S is produced and a gaseous stream containing sulphur vapor, SO2 and H2S is formed, withdrawing the gaseous stream from the reaction zone to a first cooling zone and cooling said stream therein to a temperature which condenses and maintains the sulphur in liquid form by supplying thereto sufficient cooling fluid to effect the cooling, recovering the liquid sulphur, passing the remaining gaseous mixture from the first cooling zone into a second cooling zone, supplying thereto a predetermined quantity of water at least sufficient to reduce the temperature within the second cooling zone to below the melting point of sulphur, thereby causing the precipitation therein of solid sulphur and recovering a predetermined quantity of the precipitated sulphur as a slurry of sulphur and water, and introducing the remaining slurry into the first cooling zone as the cooling fluid, and withdrawing the sulphur contained in the slurry from the first cooling zone as liquid sulphur.

WILLIAM W. ODELL.
WILLIAM DEAN HARBERT.